(12) United States Patent
Wu et al.

(10) Patent No.: US 12,045,079 B1
(45) Date of Patent: Jul. 23, 2024

(54) LIMITING MECHANISM

(71) Applicant: AAC Microtech (Changzhou) Co., Ltd., Jiangsu (CN)

(72) Inventors: Jinguo Wu, Changzhou (CN); Feng Yan, Changzhou (CN)

(73) Assignee: AAC MICROTECH (CHANGZHOU) CO., LTD., Changzhou (CN)

(*) Notice: Subject to any disclaimer, the term of this patent is extended or adjusted under 35 U.S.C. 154(b) by 0 days.

(21) Appl. No.: 18/322,623

(22) Filed: May 24, 2023

Related U.S. Application Data (63) Continuation of application No. PCT/CN2023/084761, filed on Mar. 29, 2023.

(30) Foreign Application Priority Data

Feb. 14, 2023 (CN) .......................... 202310113754.7

(51) Int. Cl.
*G05G 5/04* (2006.01)
(52) U.S. Cl.
CPC ..................................... *G05G 5/04* (2013.01)

(58) Field of Classification Search
CPC ....................................................... G05G 5/04
See application file for complete search history.

(56) References Cited

U.S. PATENT DOCUMENTS

| 4,815,339 A * | 3/1989 | Bonadies | B23Q 16/001 |
| | | | 192/139 |
| 10,817,011 B2 * | 10/2020 | Fang | F16M 11/06 |
| 11,040,443 B2 * | 6/2021 | Maie | G01B 5/0004 |

* cited by examiner

*Primary Examiner* — Vicky A Johnson
(74) *Attorney, Agent, or Firm* — W&G Law Group (57) ABSTRACT

A limiting mechanism includes: a base, a first bearing, a turntable, and a rocker assembly. The base includes a base body and a through hole. The first bearing is mounted in the through hole. The turntable includes a turntable body and a shifting lever. The rocker assembly includes a second bearing, a rocker, a slider, an elastic member, a movable magnet, and a fixed magnet. Two opposite sides of the base body corresponding to the slider are respectively provided with limiting portions evenly spaced from the slider. The shifting lever is limited through the slider and the limiting portion. The limiting mechanism of the present disclosure not only has fewer actions and has a simple structure, but also occupies a small space, has high reliability, and can reduce generation of noise.

10 Claims, 6 Drawing Sheets

LIMITING MECHANISM

TECHNICAL FIELD

The present disclosure relates to the technical field of turntable limiting, and in particular, to a limiting mechanism.

BACKGROUND

With the rapid development of mechanical technologies, more and more industries begin to use turntables to realize mechanical rotation operations.

In turntables of the related art, there are relatively few rotation positioning structures greater than ±180° (plus or minus 180°), and most of the rotation positioning structures cannot simultaneously rotate and position structures greater than +180° and greater than −180°, while rotation positioning structures in other applications adopt complex mechanical limiting such as screw positioning, matching of a follow-up slider with a bumper to cooperate with electrical limiting or software limiting to protect abnormal rotation of a rotating mechanism.

However, the above rotation positioning structures applied to turntables have many and complex actions, occupy a large space, and have relatively poor compatibility with various turntables, most of which only rely on the electrical limiting to achieve positioning of rotation greater than +180°, thereby having a potential risk of failure of electrical components and having low reliability in the application to the turntables.

Therefore, there is a need to provide a limiting mechanism to solve the above problems.

SUMMARY

The technical problem to be solved in the present disclosure is how to provide a limiting mechanism with few actions, a simple structure, small space occupation, high reliability, and effective noise reduction.

In order to solve the above technical problem, the present disclosure provides a limiting mechanism for realizing limiting of forward and reverse rotation greater than 180°. The limiting mechanism includes: a base, a first bearing, a turntable, and a rocker assembly. The base includes a base body and a through hole passing through the base body and in a circle shape. The first bearing is mounted in the through hole and forming a fixed connection with the base body. The turntable includes a turntable body and a shifting lever. The turntable body inserts into the first bearing and forms a fixed connection with the first bearing. The turntable body is in a ring shape. The shifting lever is formed by protruding from a periphery of the turntable body, a rotational connection between the turntable body and the base body is realized through the first bearing. The rocker assembly and the shifting lever are arranged on a same side of the base body; the rocker assembly includes a second bearing fixedly connected to the base body, a rocker inserted into the second bearing and forming a fixed connection with the second bearing, a slider sleeved on the rocker to form a sliding connection with the rocker, an elastic member connected between the rocker and the slider, a movable magnet fixed to an end of the slider away from the rocker, and a fixed magnet fixed to the base body and arranged opposite to the movable magnet, the rocker at an initial position and the shifting lever are located on a straight line where a diameter of the turntable body is located, the slider is spaced apart from the turntable body, a rotational connection between the rocker and the base body is realized through the second bearing; two opposite sides of the base body corresponding to the slider along a circumferential direction of the base body are respectively provided with limiting portions evenly spaced from the slider. When the shifting lever rotates clockwise or counterclockwise to abut against the slider, the shifting lever is engaged with the slider; the shifting lever continuously rotates to push the slider to rotate and simultaneously cause the slider to stretch along an axial direction of the rocker until the shifting lever rotates from the initial position to greater than 180°, so that limiting is realized by causing the slider to abut against the limiting portion on a corresponding side.

As an improvement, the base further includes an annular protruding portion, the annular protruding portion protrudes from an edge of the base body, surrounds the through hole, and has a notch; the notch is arranged directly opposite to the slider, planes on two sides of the notch serve as the two limiting portions on two opposite sides of the slider.

As an improvement, two opposites sides of the shifting lever are respectively provided with protruding bumps; two opposite sides of the slider are respectively provided with grooves recessed inward and matching the bumps; and when the shifting lever rotates clockwise or counterclockwise to abut against the slider, the shifting lever abuts against the grooves on the corresponding sides of the slider through the protruding bumps to form engagement.

As an improvement, a side of the rocker away from the base body is recessed inward to form a first accommodating groove, an end of the first accommodating groove away from the slider is provided with a protruding first mounting post; a side of the slider adjacent to the base is provided with a second accommodating groove recessed inward, an end of the second accommodating groove away from the rocker is provided with a protruding second mounting post, the second accommodating groove covers the rocker and forms a sliding connection with the rocker; and the elastic member is received in the first accommodating groove and the second accommodating groove, and two ends of the elastic member are respectively fixed to the first mounting post and the second mounting post.

As an improvement, guide grooves are respectively arranged by penetrating through two sides of the second accommodating groove; two pins arranged apart are respectively inserted in two sides of the first accommodating groove, and the two pins respectively extend into the guide grooves on the corresponding sides to limit a sliding stroke of the slider.

As an improvement, sliding contact surfaces of the slider and the rocker are both treated with diamond-like coating (DLC).

As an improvement, the base body includes a first body portion in a cylinder shape and a first extension portion formed by protruding from a periphery of the first body portion, the through hole is formed in the first body portion, and the second bearing is fixedly connected to the first extension portion.

As an improvement, the first body portion is provided with a first fixing groove recessed inward, and the second bearing is mounted in the first fixing groove and forms a fixed connection with the first body portion; the first body portion is provided with a second fixing groove recessed inward, and the fixed magnet is mounted in the second fixing groove and forms a fixed connection with the first body portion; and a side of the slider adjacent to the first body portion is provided with a third fixing groove recessed inward, and the movable magnet is mounted in the third fixing groove and forms a fixed connection with the slider.

As an improvement, the turntable body includes a second body portion in a ring shape and a second extension portion that protrudes from an inner edge of the second body portion along an axial direction thereof and is in a tubular shape, the second extension portion is inserted into and fixed to the first bearing, and the shifting lever is formed by protruding outwardly from a periphery of the second body portion along a radial direction thereof.

As an improvement, the elastic member is a spring.

Compared with the related art, in the limiting mechanism of the present disclosure, the shifting lever is arranged on the periphery of the turntable, the base body is provided with the rocker assembly formed by the second bearing, the rocker, the slider, the elastic member, the movable magnet, and the fixed magnet, and two opposite sides of the base body corresponding to the slider along a circumferential direction thereof are respectively provided with limiting portions evenly spaced from the slider. In this way, when the turntable rotates to nearly 180° and the shifting lever abuts against the slider, the slider can be pushed to rotate to the limiting portion on the corresponding side, so as to limit the shifting lever. That is, limiting of the turntable greater than 180° is realized. In the case of resetting, the shifting lever is disengaged from the slider, and the slider may rebound under the action of the elastic member and be reset under magnetic forces of the movable magnet and the fixed magnet, so that the rocker assembly may not rotate back and forth on the base body, so as to reduce generation of noise and have good stability. In addition, the limiting mechanism of the present disclosure adopts mechanical limiting, which not only has few actions and a simple structure, but also occupies a small space and has high reliability.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

In the drawings, 100: limiting mechanism; 1: base; 11: base body; 111: first body portion; 112: first extension portion; 113: first fixing groove; 114: second fixing groove; 12: through hole; 13: limiting portion; 14: annular protruding portion; 2: first bearing; 3: turntable; 31: turntable body; 311: second body portion; 312: second extension portion; 32: shifting lever; 321: bump; 4: rocker assembly; 41: second bearing; 42: rocker; 421: first accommodating groove; 422: first mounting post; 423: pin; 424: rotating shaft; 43: slider; 431: second groove; 432: second accommodating groove; 433: second mounting post; 434: guide groove; 435: third fixing groove; 44: elastic member; 45: movable magnet; 46: fixed magnet.

DESCRIPTION OF EMBODIMENTS

The technical solutions in the embodiments of the present disclosure will be clearly and completely described below with reference to the accompanying drawings in the embodiments of the present disclosure. Obviously, the described embodiments are only part of instead of all of the embodiments of the present disclosure. Based on the embodiments in the present disclosure, all other embodiments obtained by those of ordinary skill in the art without creative efforts fall within the protection scope of the present disclosure.

Figure 1:
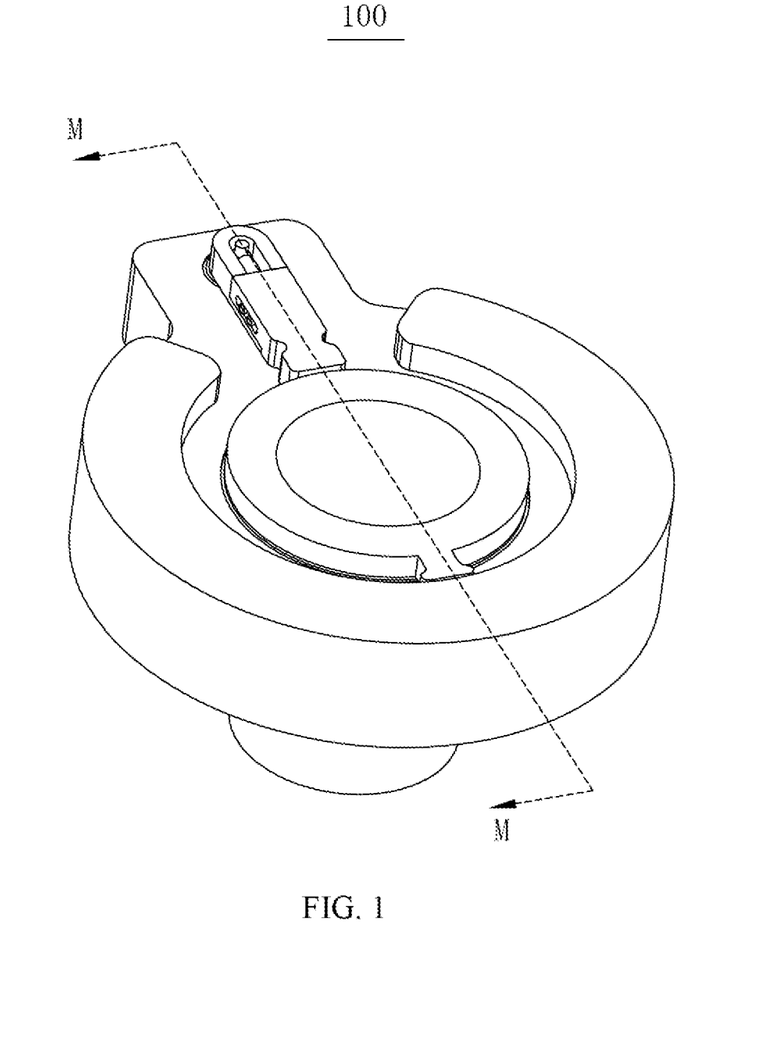
FIG. 1 is a perspective view of a limiting mechanism according to an embodiment of the present disclosure.
Figure 2:
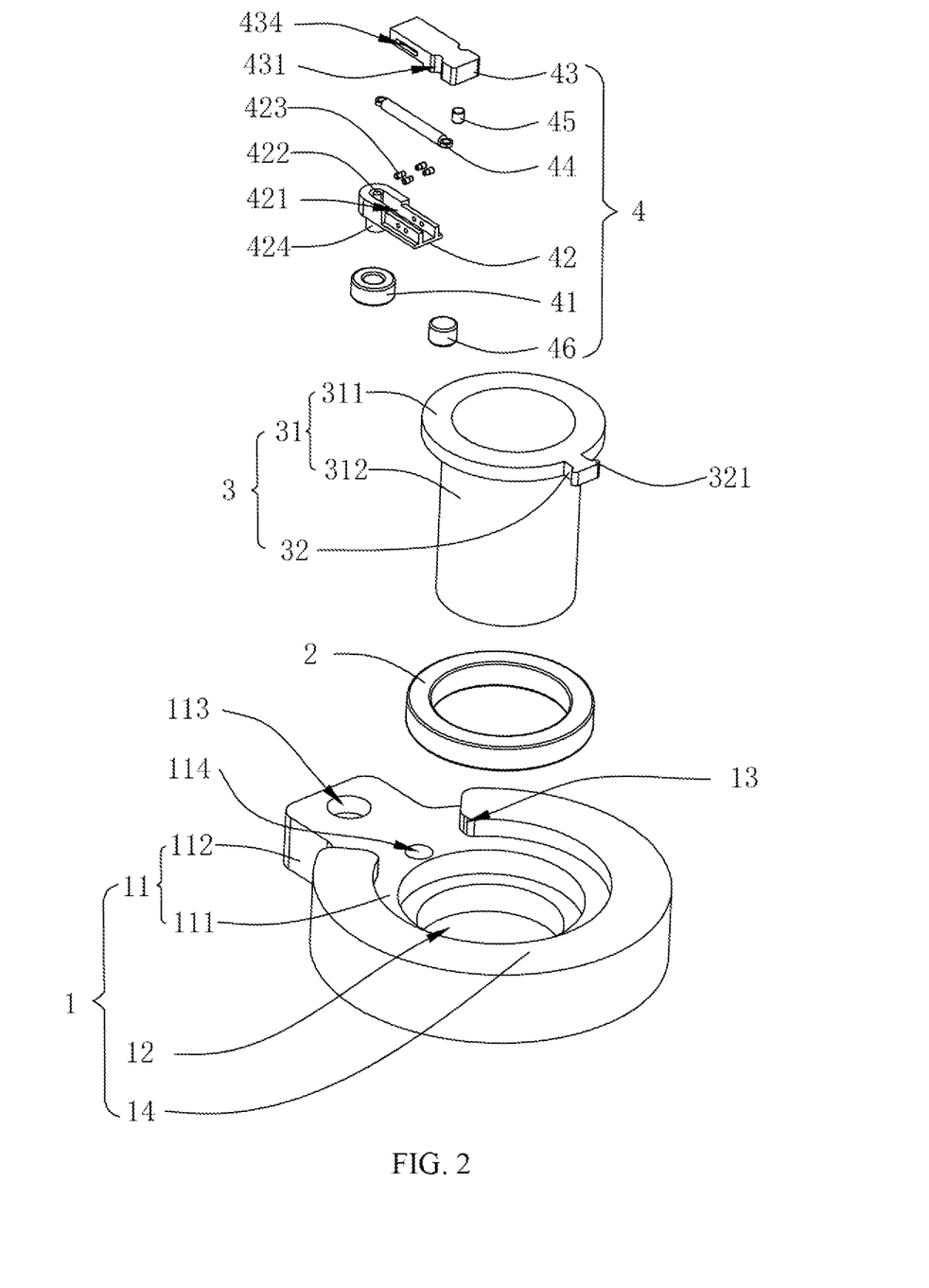
FIG. 2 is a schematic diagram of an exploded structure of a limiting mechanism according to an embodiment of the present disclosure.
Figure 3:
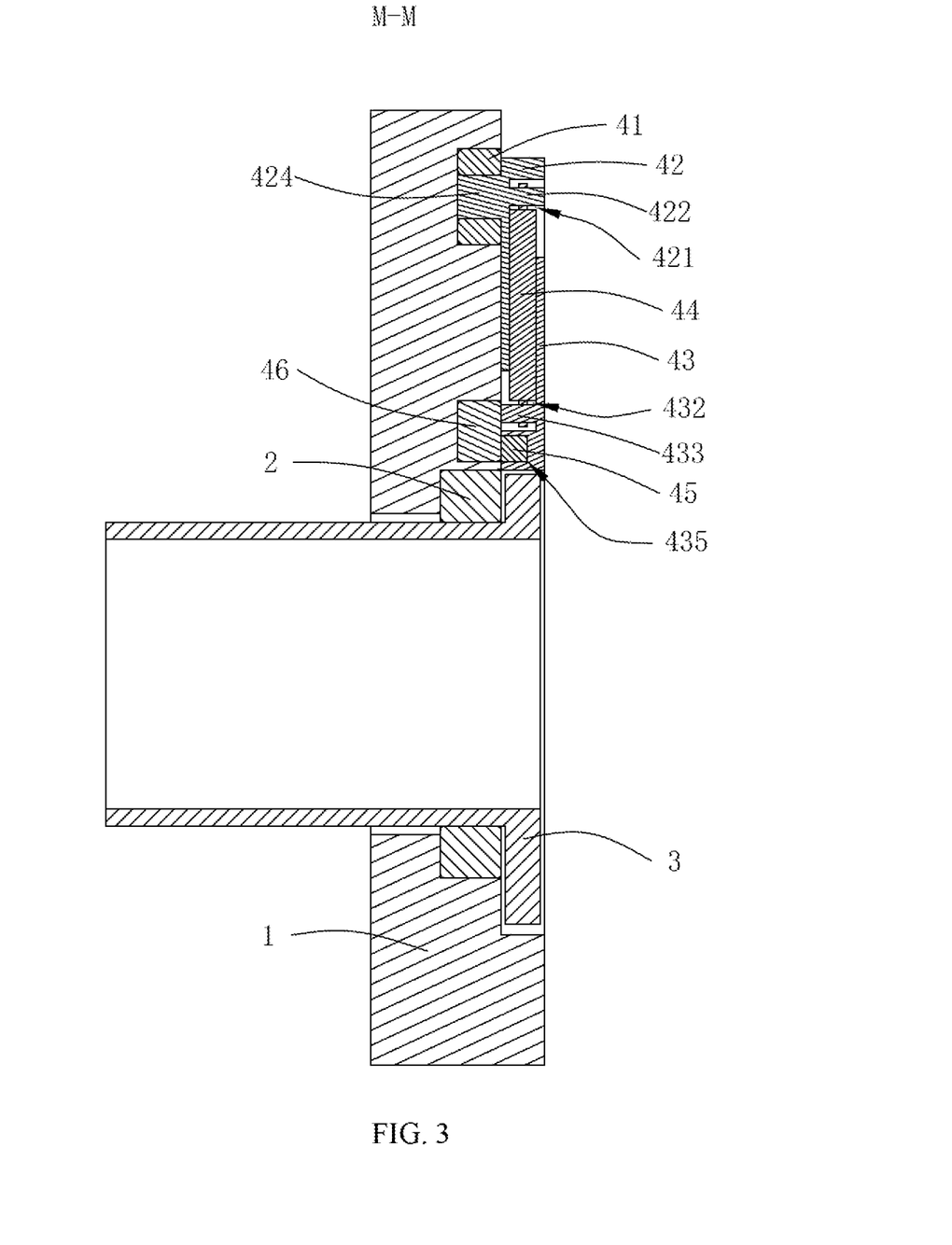
FIG. 3 is a sectional view taken along a line M-M of FIG. 1.

An embodiment of the present disclosure provides a limiting mechanism 100, which, referring to FIG. 1 to FIG. 3, includes a base 1, a first bearing 2, a turntable 3, and a rocker assembly 4.

The base 1 includes a base body 11 and a through hole 12. The through hole 12 passes through the base body 11 and has a circle shape. The first bearing 2 is mounted in the through hole 12 and forms a fixed connection with the base body 11.

The turntable 3 includes a turntable body 31 and a shifting lever 32. The turntable body 31 has a ring shape, is inserted into the first bearing 2, and forms a fixed connection with the first bearing 2. The shifting lever 32 is formed by protruding from a periphery of the turntable body 31. The turntable body 31 realizes a rotational connection with the base body 11 through the first bearing 2.

The rocker assembly 4 and the shifting lever 32 are arranged on a same side of the base body 11. The rocker assembly 4 includes a second bearing 41 fixedly connected to the base body 11, a rocker 42 inserted into the second bearing 41 and forming a fixed connection therewith, a slider 43 sleeved on the rocker 42 to form a sliding connection therewith, an elastic member 44 connected between the rocker 42 and the slider 43, a movable magnet 45 fixed to an end of the slider 43 away from the rocker 42, and a fixed magnet 46 fixed to the base body 11 and arranged opposite to the movable magnet 45. The rocker 42 at an initial position and the shifting lever 32 are simultaneously located on a straight line where a same diameter of the turntable body 31 is located, and the slider 43 is spaced apart from the turntable body 31. A rotational connection between the rocker 42 and the base body 11 is realized through the second bearing 41. Two opposite sides of the base body 11 corresponding to the slider 43 along a circumferential direction thereof are respectively provided with limiting portions 13 evenly spaced from the slider 43.

When the shifting lever 32 rotates clockwise or counterclockwise to abut against the slider 43, the shifting lever 32 is engaged with the slider 43. The shifting lever 32 continuously rotates to push the slider 43 to rotate and simultaneously cause the slider 43 to stretch along an axial direction of the rocker 42 until the shifting lever 32 rotates from the initial position to greater than 180°, causing the slider 43 to abut against the limiting portion 13 on the corresponding side to realize limiting.

A side of the rocker 42 adjacent to the base body 11 is provided with a protruding rotating shaft 424, and the rocker 42 is inserted into the second bearing 41 through the rotating shaft 424 and forms a fixed connection therewith.

The elastic member 44 is a spring. According to an actual requirement, a member with elastic recovery such as a C-shaped elastic piece or an S-shaped elastic piece may be alternatively selected as the elastic member 44.

In this embodiment, the base body 11 includes a first body portion 111 in a cylinder shape and a first extension portion 112 formed by protruding from a periphery of the first body portion 111. The through hole 12 is formed in the first body portion 111. That is, the through hole 12 is arranged through a middle region of the first body portion 111. The second bearing 41 is fixedly connected to the first extension portion 112. That is, the rocker assembly 4 is arranged on the first extension portion 112, and the slider 43 thereof may be extended to the first body portion 111. The base body 11 is arranged as the first body portion 111 and the first extension portion 112, so that a mounting area of the base body 11 can be increased to facilitate the spaced arrangement of the turntable 3 and the rocker assembly 4.

In this embodiment, the first body portion 111 is provided with a first fixing groove 113 recessed inward, and the second bearing 41 is mounted in the first fixing groove 113 and forms a fixed connection with the first body portion 111. The first body portion 111 is provided with a second fixing groove 114 recessed inward, and the fixed magnet 46 is mounted in the second fixing groove 114 and forms a fixed connection with the first body portion 111. A side of the slider 43 adjacent to the first body portion 111 is provided with a third fixing groove 435 recessed inward, and the movable magnet 45 is mounted in the third fixing groove 435 and forms a fixed connection with the slider 43. The second bearing 41 is mounted in the first fixing groove 113 recessed inward, the fixed magnet 46 is mounted in the second fixing groove 114 recessed inward, and the movable magnet 45 is mounted in the third fixing groove 435 recessed inward. In this way, an overall height of the limiting mechanism 100 can be reduced. That is, a space occupied by a height of the limiting mechanism 100 during application can be reduced, so that applicability thereof is better.

In this embodiment, the base 1 further includes an annular protruding portion 14 protruding from an edge of the base body 11, arranged around the through hole 12, and having a notch. The notch is arranged directly opposite to the slider 43, and planes on two sides of the notch serve as the two limiting portions 13 on two opposite sides of the slider 43.

The annular protruding portion 14 is specifically arranged on the first body portion 111, and the notch thereof is aligned with an extension direction of the first extension portion 112.

According to an actual requirement, the limiting portions 13 on two opposite sides of the slider 43 may alternatively protrude directly from the first body portion 111 to form a cylinder or a block, and are not necessarily required to form a ring structure with a notch.

In this embodiment, the turntable body 31 includes a second body portion 311 in a ring shape and a second extension portion 312 protruding from an inner edge of the second body portion 311 along an axial direction thereof and in a tubular shape. That is, the turntable 3 has a hollow structure. This arrangement can facilitate a wiring harness to pass and prevent excessive twisting of the wiring harness caused by rotation of the turntable 3. The second extension portion 312 is inserted into and fixed to the first bearing 2 and extends outwardly through the through hole 12. The shifting lever 32 is formed by protruding outwardly from a periphery of the second body part 311 along a radial direction thereof.

In this embodiment, two opposite sides of the shifting lever 32 are respectively provided with protruding bumps 321. Two opposite sides of the slider 43 are respectively provided with grooves 431 recessed inward and matching the bumps 321. When the shifting lever 32 rotates clockwise or counterclockwise to abut against the slider 43, the shifting lever 32 abuts against the grooves 431 on the corresponding sides of the slider 43 through the bumps 321 to form engagement. In this way, meshed limiting can be formed between the shifting lever 32 and the slider 43, and sliding generated when the shifting lever 32 abuts against the slider 43 can be prevented.

In this embodiment, a side of the rocker 42 away from the base body 11 is recessed inward to form a first accommodating groove 421, and an end of the first accommodating groove 421 away from the slider 43 is provided with a protruding first mounting post 422. A side of the slider 43 adjacent to the base 1 is provided with a second accommodating groove 432 recessed inward, an end of the second accommodating groove 432 away from the rocker 42 is provided with a protruding second mounting post 433, and the second accommodating groove 432 covers the rocker 42 and forms a sliding connection therewith. The elastic member 44 is received in the first accommodating groove 421 and the second accommodating groove 432, and two ends of the elastic member 44 are respectively fixed to the first mounting post 422 and the second mounting post 433. In this way, the elastic member 44 can be received between the rocker 42 and the slider 43 to reduce a height of the rocker assembly 4.

In addition, guide grooves 434 are respectively arranged through two sides of the second accommodating groove 432. Two pins 423 arranged apart are respectively inserted on two sides of the first accommodating groove 421, and the pins 423 respectively extend into the guide grooves 434 on the corresponding sides to limit a sliding stroke of the slider 43. In this way, control over the sliding stroke of the slider 43 can be realized by the pin 423 abutting against an end portion of the guide groove 434.

In this embodiment, sliding contact surfaces of the slider 43 and the rocker 42 are both treated with diamond-like coating (DLC). In this way, hardness and wear resistance of the slider 43 can be effectively improved to reduce a coefficient of friction between the slider and the rocker 42, thereby improving sliding performance of the slider 43 and reducing rotating torque of the turntable 3.

The limiting mechanism 100 in this embodiment may be applied to mechanical structures that require rotation limiting, such as a robot turntable 3 and a rotating portion of a desktop fan.

In this embodiment, a principle of the limiting mechanism 100 is as follows. When the turntable 3 is at the initial position, the shifting lever 32 of the turntable 3 and the rocker assembly 4 are respectively located on two opposite sides of the turntable 3. When the turntable 3 starts to rotate and rotates to nearly 180°, the bump 321 on the shifting lever 32 may engage with and abut against the groove 431 on the slider 43. In this case, since the slider 43 is slidably connected to the rocker 42 and the two are connected by a spring, the turntable 3 can still rotate to greater than 180°. That is, the slider 43 is driven by the shifting lever 32 to rotate together until 180° is exceeded, and the slider 43 cannot rotate under the abutting of the limiting portion 13 on the corresponding side thereof, so as to complete limiting of abutting of the turntable 3 greater than 180°. When the turntable 3 is required to be reset, the bump 321 on the shifting lever 32 may be disengaged from the groove 431 on the slider 43. In this case, the slider 43 may rebound under an elastic force of the spring and control a posture of the slider 43 to prevent shaking and reduce generation of noise, and at the same time prevent friction between the slider 43 and the turntable 3. In addition, the slider 43 is further reset through the fixed magnet 46 and the magnetic force of the fixed magnet 46, which prevents noise generated due to collision with the limiting portion 13 caused by left and right shaking of the rocker assembly 4, so as to further reduce the noise generated.

Figure 4:
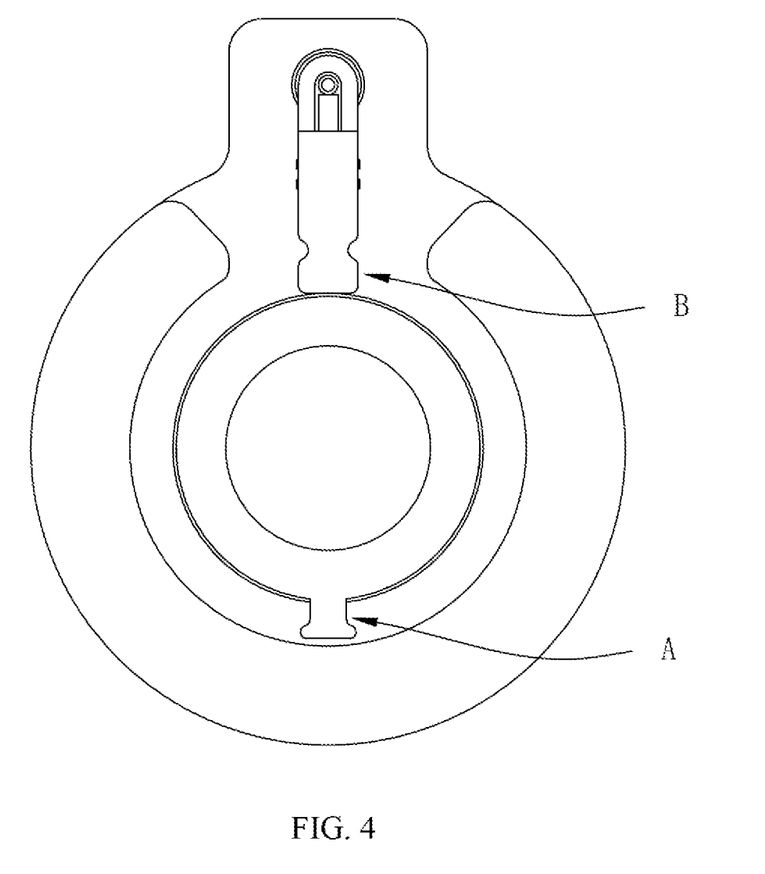
FIG. 4 is a schematic plan view when a turntable in a limiting mechanism according to an embodiment of the present disclosure is at an initial position.
Figure 5:
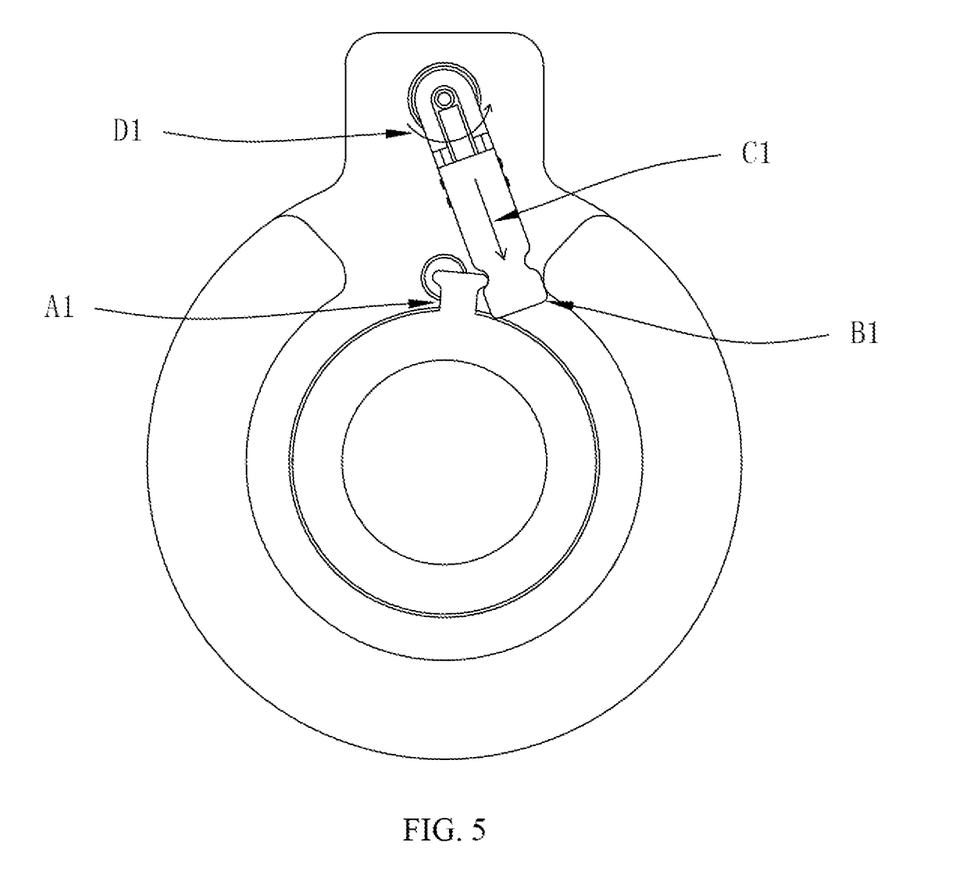
FIG. 5 is a schematic plan view when a turntable in a limiting mechanism according to an embodiment of the present disclosure rotates forward to greater than 180° and is limited.
Figure 6:
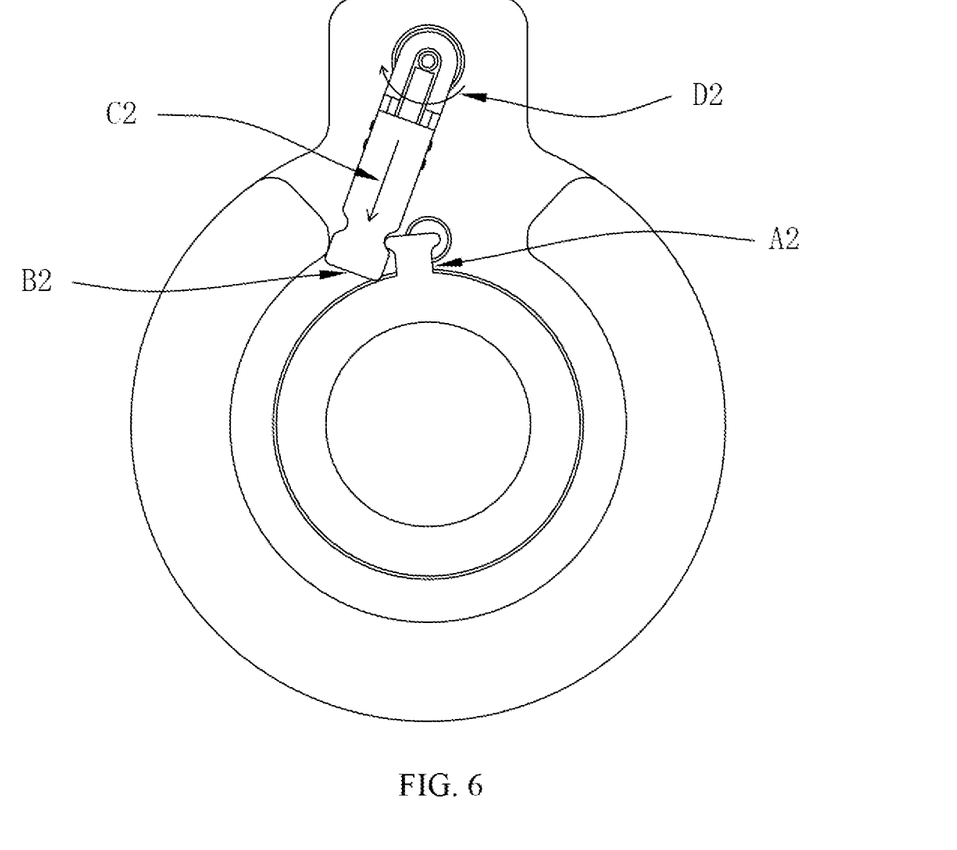
FIG. 6 is a schematic plan view when a turntable in a limiting mechanism according to an embodiment of the present disclosure rotates reversely to greater than 180° and is limited.

Referring to FIG. 4 to FIG. 6, FIG. 4 is a schematic plan view when the turntable 3 in the limiting mechanism 100 according to an embodiment is at the initial position, FIG. 5 is a schematic plan view when the turntable 3 in the limiting mechanism 100 according to this embodiment rotates forward to greater than 180° and is limited, and FIG. 6 is a schematic plan view when the turntable 3 in the limiting mechanism 100 according to an embodiment rotates reversely to greater than 180° and is limited. A specific limiting principle is as follows.

As shown in FIG. 4, when the turntable 3 is at the initial position, the shifting lever 32 is at a position A, and the slider 43 is at a position B under the action of the spring, the movable magnet 45, and the fixed magnet 46.

As shown in FIG. 5, during forward rotation (clockwise rotation) of the turntable 3 to greater than 180°, the bump 321 of the shifting lever 32 engages with the groove 431 of the slider 43 and pushes the slider 43 to move from the position B to a position B1 along a rotating direction of the shifting lever 32. In this process, the rocker assembly 4 rotates around a direction D1 (a counterclockwise direction of the rotating shaft 424), and the slider 43 slides along a direction C1. At the same time, the limiting portion 13 on the corresponding side of the base body 11 prevents further rightward movement of the slider 43, so as to lock the movement of the slider 43, and the locking of the slider 43 limits further forward rotation of the turntable 3, so that the shifting lever 32 of the turntable 3 is at a position A1, thereby realizing limiting of forward rotation of the turntable 3 greater than 180°. When the turntable 3 returns to the position A (reset), the bump 321 of the shifting lever 32 is disengaged from the groove 431 of the slider 43 and returns to the position A, and the slider 43 slides back to the initial position along an opposite direction of C1 under the action of the spring. At the same time, the fixed magnet 46 on the base body 11 attracts the movable magnet 45 on the slider 43, so that the rocker assembly 4 returns to the initial position. Finally, the slider 43 returns to the position B from the position B1, realizing a position constraint on the slider 43.

As shown in FIG. 6, during reverse rotation (counterclockwise rotation) of the turntable 3 to greater than 180°, the bump 321 of the shifting lever 32 engages with the groove 431 of the slider 43 and pushes the slider 43 to move from the position B to a position B2 along the rotating direction of the shifting lever 32. In this process, the rocker assembly 4 rotates around a direction D2 (a clockwise direction of the rotating shaft 424), and the slider 43 slides along a direction C2. At the same time, the limiting portion 13 on the corresponding side of the base body 11 prevents further leftward movement of the slider 43, so as to lock the movement of the slider 43, and the locking of the slider 43 limits further reverse rotation of the turntable 3, so that the shifting lever 32 of the turntable 3 is at a position A2, thereby realizing limiting of forward rotation of the turntable 3 greater than 180°. When the turntable 3 returns to the position A (reset), the bump 321 of the shifting lever 32 is disengaged from the groove 431 of the slider 43 and returns to the position A, and the slider 43 slides back to the initial position along an opposite direction of C2 under the action of the spring. At the same time, the fixed magnet 46 on the base body 11 attracts the movable magnet 45 on the slider 43, so that the rocker assembly 4 returns to the initial position. Finally, the slider 43 returns to the position B from the position B2, realizing a position constraint on the slider 43.

Compared with the related art, in the limiting mechanism 100 of the present disclosure, the shifting lever 32 is arranged on the periphery of the turntable 3, the base body 11 is provided with the rocker assembly 4 formed by the second bearing 41, the rocker 42, the slider 43, the elastic member 44, the movable magnet 45, and the fixed magnet 46, and two opposite sides of the base body 11 corresponding to the slider 43 along a circumferential direction thereof are respectively provided with limiting portions 13 evenly spaced from the slider 43. In this way, when the turntable 3 rotates to nearly 180° and the shifting lever 32 abuts against the slider 43, the slider 43 can be pushed to rotate to the limiting portion 13 on the corresponding side, so as to limit the shifting lever 32. That is, limiting of the turntable 3 greater than 180° is realized. In the case of resetting, the shifting lever 32 is disengaged from the slider 43, and the slider 43 may rebound under the action of the elastic member 44 and be reset under magnetic forces of the movable magnet 45 and the fixed magnet 46, so that the rocker assembly 4 may not rotate back and forth on the base body 11, so as to reduce generation of noise and have good stability. In addition, the limiting mechanism 100 of the present disclosure adopts mechanical limiting, which not only has few actions and a simple structure, but also occupies a small space and has high reliability.

The above description is only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. A limiting mechanism for realizing limiting of forward and reverse rotation greater than 180°, comprising:
    a base comprising a base body and a through hole passing through the base body and in a circle shape;
    a first bearing mounted in the through hole and forming a fixed connection with the base body;
    a turntable comprising a turntable body and a shifting lever, wherein the turntable body inserts into the first bearing and forms a fixed connection with the first bearing, and the turntable body is in a ring shape, the shifting lever is formed by protruding from a periphery of the turntable body, a rotational connection between the turntable body and the base body is realized through the first bearing; and
    a rocker assembly, wherein the rocker assembly and the shifting lever are arranged on a same side of the base body; the rocker assembly comprises a second bearing fixedly connected to the base body, a rocker inserted into the second bearing and forming a fixed connection with the second bearing, a slider sleeved on the rocker to form a sliding connection with the rocker, an elastic member connected between the rocker and the slider, a movable magnet fixed to an end of the slider away from the rocker, and a fixed magnet fixed to the base body and arranged opposite to the movable magnet, the rocker at an initial position and the shifting lever are located on a straight line where a diameter of the turntable body is located, the slider is spaced apart from the turntable body, a rotational connection between the rocker and the base body is realized through the second bearing; two opposite sides of the base body corresponding to the slider along a circumferential direction of the base body are respectively provided with limiting portions evenly spaced from the slider;

wherein when the shifting lever rotates clockwise or counterclockwise to abut against the slider, the shifting lever is engaged with the slider; the shifting lever continuously rotates to push the slider to rotate and simultaneously cause the slider to stretch along an axial direction of the rocker until the shifting lever rotates from the initial position to greater than 180°, so that limiting is realized by causing the slider to abut against the limiting portion on a corresponding side.

2. The limiting mechanism as described in claim 1, wherein the base further comprises an annular protruding portion, the annular protruding portion protrudes from an edge of the base body, surrounds the through hole, and has a notch; the notch is arranged directly opposite to the slider, planes on two sides of the notch serve as the two limiting portions on two opposite sides of the slider.

3. The limiting mechanism as described in claim 1, wherein two opposites sides of the shifting lever are respectively provided with protruding bumps; two opposite sides of the slider are respectively provided with grooves recessed inward and matching the bumps; and when the shifting lever rotates clockwise or counterclockwise to abut against the slider, the shifting lever abuts against the grooves on the corresponding sides of the slider through the protruding bumps to form engagement.

4. The limiting mechanism as described in claim 1, wherein a side of the rocker away from the base body is recessed inward to form a first accommodating groove, an end of the first accommodating groove away from the slider is provided with a protruding first mounting post; a side of the slider adjacent to the base is provided with a second accommodating groove recessed inward, an end of the second accommodating groove away from the rocker is provided with a protruding second mounting post, the second accommodating groove covers the rocker and forms a sliding connection with the rocker; and the elastic member is received in the first accommodating groove and the second accommodating groove, and two ends of the elastic member are respectively fixed to the first mounting post and the second mounting post.

5. The limiting mechanism as described in claim 4, wherein guide grooves are respectively arranged by penetrating through two sides of the second accommodating groove; two pins arranged apart are respectively inserted in two sides of the first accommodating groove, and the two pins respectively extend into the guide grooves on the corresponding sides to limit a sliding stroke of the slider.

6. The limiting mechanism as described in claim 1, wherein sliding contact surfaces of the slider and the rocker are both treated with diamond-like coating (DLC).

7. The limiting mechanism as described in claim 1, wherein the base body comprises a first body portion in a cylinder shape and a first extension portion formed by protruding from a periphery of the first body portion, the through hole is formed in the first body portion, and the second bearing is fixedly connected to the first extension portion.

8. The limiting mechanism as described in claim 7, wherein the first body portion is provided with a first fixing groove recessed inward, and the second bearing is mounted in the first fixing groove and forms a fixed connection with the first body portion; the first body portion is provided with a second fixing groove recessed inward, and the fixed magnet is mounted in the second fixing groove and forms a fixed connection with the first body portion; and a side of the slider adjacent to the first body portion is provided with a third fixing groove recessed inward, and the movable magnet is mounted in the third fixing groove and forms a fixed connection with the slider.

9. The limiting mechanism as described in claim 1, wherein the turntable body comprises a second body portion in a ring shape and a second extension portion that protrudes from an inner edge of the second body portion along an axial direction thereof and is in a tubular shape, the second extension portion is inserted into and fixed to the first bearing, and the shifting lever is formed by protruding outwardly from a periphery of the second body portion along a radial direction thereof.

10. The limiting mechanism as described in claim 1, wherein the elastic member is a spring.

\* \* \* \* \*